United States Patent [19]
McDonald et al.

[11] 4,182,417
[45] Jan. 8, 1980

[54] METHOD FOR CONTROLLING PERMEABILITY OF SUBTERRANEAN FORMATIONS

[75] Inventors: Charles J. McDonald, Midland, Mich.; John V. Van Landingham, Sapulpa, Okla.; Steven P. Givens, Midland, Mich.

[73] Assignee: The Dow Chemical Company, Midland, Mich.

[21] Appl. No.: 813,903

[22] Filed: Jul. 8, 1977

[51] Int. Cl.$^2$ .................. E21B 33/138; E21B 43/22
[52] U.S. Cl. .................................. 166/295; 166/274; 252/8.5 C; 252/8.55 K; 252/8.55 D
[58] Field of Search ............... 252/8.55 R, 8.55 D; 166/295, 274

[56] References Cited

U.S. PATENT DOCUMENTS

| | | | |
|---|---|---|---|
| 3,247,171 | 4/1966 | Walker et al. | 526/23 |
| 3,490,533 | 1/1970 | McLaughlin | 166/270 |
| 3,730,271 | 5/1973 | Gall | 166/295 |
| 3,749,172 | 7/1973 | Hessert et al. | 166/274 |
| 3,780,806 | 12/1973 | Bott | 166/275 |
| 3,785,437 | 1/1974 | Clampitt et al. | 166/281 |
| 3,921,733 | 11/1975 | Clampitt | 166/294 X |
| 3,926,258 | 12/1975 | Hessert et al. | 166/295 X |
| 4,059,552 | 11/1977 | Zweigle et al. | 526/306 X |

*Primary Examiner*—Herbert B. Guynn

[57] ABSTRACT

In the recovery of hydrocarbon materials from subterranean formations, the simultaneous production or loss of other fluids such as water is inhibited by the selective introduction into the subterranean porous structure of discrete spheroidal microgels of a water-swollen or water-swellable, crosslinked polymer such as crosslinked polyacrylamide.

8 Claims, No Drawings

METHOD FOR CONTROLLING PERMEABILITY OF SUBTERRANEAN FORMATIONS

BACKGROUND OF THE INVENTION

This invention relates to methods for the production of hydrocarbon materials such as oil and natural gas by the recovery of such hydrocarbon materials from subterranean oil bearing reservoirs.

One of the more significant problems attendant to the recovery of hydrocarbon materials from subterranean formations is the concommitant recovery of undesirable fluids such as water. Such recovered water can be brine native to the formation or it can be injection water employed in enhanced oil recovery treatments being applied to the reservoir. Whatever the source, there is an upper limit beyond which water production can no longer be tolerated and its further entry into the producing well bore must be reduced. In addition other fluids such as natural gas are sometimes undesirable particularly when such fluids exceed the upper limits of gas:oil ratio desired for most efficient recovery of the hydrocarbons.

As is well known, many oil reservoirs comprise layers or zones of porous rock which can vary in permeability from less than 10 millidarcies to more than 1000 millidarcies. Regardless of whether the undesired fluid is a natural drive fluid or one coming from an enhanced oil recovery operation, there is a real tendency for the drive fluid to channel along or through the more permeable zones of the formation. Such channeling, often called fingering, generally hinders or prevents the recovery of oil from less permeable zones. For example, the more permeable zones, after oil has been largely displaced therefrom, function as thief zones which permit the drive fluid to channel directly into the production or recovery well.

Among the prior solutions to the problem of undesirable fluid entry into the production well is the placement of a solid plug of a material such as cement within the formation. Unfortunately, such solid plugs often inhibit the use of drive fluids to assist in forcing desired hydrocarbon material from the formation into the producing or recovery well bore. In addition the use of such solid plugs invariably results in the permanent loss of desired fluids. Further, should the undesirable fluids seep by or otherwise bypass such solid plugs, the plug cannot shift position to block such seepage or other changes in flow pattern of the undesired fluid.

In order to overcome the deficiencies associated with the use of solid plugs, it has been a common practice to modify the mobility of the driving fluid by pumping a highly viscous fluid into the oil bearing formation. An illustration of this technique is the incorporation of a partially hydrolyzed polyacrylamide in an aqueous drive fluid such as described in U.S. Pat. No. 3,039,529. While the recovery of hydrocarbon by employing such techniques is measurably enhanced, substantial quantities of polymers must be added to the drive fluid in order to maintain the desired high viscosity. Moreover in cases of highly porous subterranean structures which are proximate to oil bearing formations of relatively low permeability, substantial quantities of the undesirable drive fluid are often recovered.

More recently, as disclosed in U.S. Pat. Nos. 3,780,806 and 3,785,437, it has been a practice to attempt to plug some of the more porous formations by introducing a water soluble polymer into the highly porous structure and crosslinking the polymer in situ to form a water-insoluble gel. Alternatively, as disclosed in U.S. Pat. No. 3,921,733, attempts have been made to pump a partially gelled polymer into a porous formation ahead of the drive fluid. All of these procedures suffer from handling problems characteristic of two component systems comprising a polymer and a crosslinking agent. For example, most of the procedures involve the addition of a dry polymer to an aqueous medium at the well site which gives rise to difficulties in solubilizing the polymer. More importantly, it is difficult to control the gelation characteristics of the polymer as needed to insure effective control of formation permeability.

In view of the deficiencies of prior art methods for controlling permeability in subterranean structures as needed for recovery of hydrocarbon materials, it would be highly desirable to provide an improved oil recovery method which essentially eliminates many of the problems characteristic of the aforementioned in situ gelation techniques.

SUMMARY OF THE INVENTION

In one aspect, the present invention is such an improved oil recovery method whereby the fluid permeability of a subterranean geological formation is modified, preferably to restrict the passage of fluids (particularly aqueous fluids) therethrough. Alternatively, such modification of the fluid permeability of the formation can be expressed as controlling the mobility of fluids in the formation. In the practice of this invention, the desired control of fluid mobility is achieved by the improved method which comprises introducing into the subterranean formation, preferably via a well bore, a fluid medium containing discrete, spheroidal microgels of a water-swellable or water-swollen, crosslinked polymer in an amount sufficient to control the mobility of fluids in the subterranean formation.

The microgels have partly or totally water-swollen diameters which are generally within the range from about 0.5 to about 200 micrometers and are very useful in treatment of porous subterranean strata that are commonly found in hydrocarbon bearing formations. The microgels when dispersed in water or other aqueous media exist as discrete, spheroidal, water-swollen particles which can be separated from the aqueous media by filtration or other similar technique.

The fluid medium containing the microgels is most advantageously low in viscosity and therefore much more easily pumped into the desired porous formation than are conventional high viscosity water-soluble polymers or partially gelled polymers used hereinbefore. This advantageous property is believed to be due to the discrete, spheroidal characteristics of the microgels as well as to their relatively controlled particle size and crosslinked character. These characteristics enable the microgels to penetrate deeply into the pores of the porous structure to be restricted or plugged. Surprisingly, the microgels are not readily displaced even when the direction of liquid flow in the subterranean structure is reversed.

Accordingly, the improved method of the present invention is most advantageously employed in enhanced oil recovery operations wherein a drive fluid is introduced through a bore hole in the earth into a porous subterranean formation penetrated by said bore hole thereby driving oil from oil bearing structures toward a producing well. In addition such fluid media containing the microgels are usefully employed as the fluid in well drilling operations, as packer fluids in well completion operations and as mobility control fluids in other enhanced oil recovery operations. Methods using such media in drilling operations, in well completion operations, and as friction reduction aids in normal water flooding operations as well as in fracturing processes are additional aspects of the invention. It is further observed that fluid media containing the microgels are very useful in the treatment of subterranean structures containing substantial amounts of salt water or brine which normally hinder or prevent the gelation reactions required in in situ gelation procedures.

DETAILED DESCRIPTION OF THE EMBODIMENTS

The microgels which are essential to the practice of the present invention are generally characterized as discrete, well defined spheroids that are water-swellable and/or water-swollen. In their water-swollen or at least partially water-swollen state, the microgels comprise water and a crosslinked polymer of a water-soluble ethylenically unsaturated monomer. Perhaps one of the most significant characteristics of the microgels is their ability to absorb substantial proportions of water. In their partially or totally water-swollen state, the particle sizes of the microgels can range from about 0.5 to about 200 micrometers, preferably from about 1 to about 10 micrometers. In the dry state, the microgels exist as microbeads having diameters generally less than about 20 micrometers, preferably less than about 1 micrometer. In their partially water-swollen (pre-inversion) state, the microgels are water-swellable and contain at least about 30 weight percent of crosslinked polymer and up to about 70 weight percent of water. In their totally water-swollen state, the microgels contain up to about 99.9 weight percent of water and as little as about 0.1 weight percent of crosslinked polymer. The microgels, when dispersed in a fluid aqueous medium such as water, can be subjected to substantial amounts of high shear, e.g., $>500,000$ sec$^{-1}$, which is characteristic of the pumping action existing in many enhanced oil recovery operations without undergoing substantial degradation, i.e., loss of particle size or capacity to hold water (often called gel capacity).

Ethylenically unsaturated monomers suitable for use in preparing the microgels are those which are sufficiently water-soluble to form at least 5 weight percent solutions when dissolved in water and which readily undergo addition polymerization to form polymers which are at least inherently water dispersible and preferably water-soluble. By "inherently water dispersible", it is meant that the polymer when contacted with an aqueous medium will disperse therein without the aid of surfactants to form a colloidal dispersion of the polymer in the aqueous medium. Exemplary monomers include the water-soluble ethylenically unsaturated amides such as acrylamide, methacrylamide and fumaramide; N-substituted ethylenically unsaturated amides such as N-substituted-(N'-dialkylaminoalkyl)acrylamides, e.g., N-(dimethylaminomethyl)acrylamide and N-(diethylaminomethyl)methacrylamide and quaternized derivatives thereof, e.g., N-(trimethylammoniummethyl)acrylamide chloride; ethylenically unsaturated carboxylic acids such as acrylic acid, methacrylic acid, itaconic acid, fumaric acid and the like; ethylenically unsaturated quaternary ammonium compounds such as vinylbenzyltrimethylammonium chloride; sulfoalkyl esters or carboxylic acids such as 2-sulfoethyl methacrylate and the alkali metal and ammonium salts thereof; aminoalkyl esters of unsaturated carboxylic acids such as 2-aminoethyl methacrylate; vinylaryl sulfonates such as vinylbenzene sulfonates including the alkali metal and ammonium salts thereof and the like.

Of the foregoing water-soluble monomers, acrylamide, methacrylamide and combinations thereof with acrylic acids or methacrylic acid are preferred, with acrylamide and combinations thereof with up to 70 weight percent of acrylic acid being more preferred. Most preferred are the copolymers of acrylamide with from about 5 to about 40, especially from about 15 to about 30, weight percent of acrylic acid. The particle size of the microgels of these most preferred copolymers is more easily controlled than are the acid-free copolymers. For example, the addition of polyvalent metal ions such as calcium, magnesium and the like to aqueous compositions containing the microgels reduces the particle sizes of microgels by a highly predictable amount.

In the most preferred embodiments, it is desirable that the total monomer mixture contain a relatively small proportion (i.e., an amount sufficient to crosslink the polymer, thereby converting the polymer to a non-linear polymeric microgel without appreciably reducing water swellability characteristics of the polymer) of a copolymerizable polyethylenic monomer. Exemplary suitable comonomeric crosslinking agents include divinylarylsulfonates such as divinylbenzenesulfonate, diethylenically unsaturated diesters including alkylene glycol diacrylates and dimethacrylates such as ethylene glycol diacrylate, ethylene glycol methacrylate and propylene glycol diacrylate; ethylenically unsaturated esters of ethylenically unsaturated carboxylic acids such as allyl acrylate; diethylenically unsaturated ethers such as diallyl ethylene glycol ether, divinyl ether, diallyl ether, divinyl ether of ethylene glycol, divinyl ether of diethylene glycol, divinyl ether of triethylene glycol; N,N'-alkylidene-bis(ethylenically unsaturated amides) such as N,N'-methylene-bis(acrylamide), N,N'-methylene-bis(methacrylamide), and other lower alkylidene-bis(ethylenically unsaturated amides) wherein the alkylidene group has from 1 to 4 carbons. When a crosslinking comonomer is the means employed to provide the necessary crosslinking, any amount of such crosslinking agent in the monomer mixture is suitable provided that it is sufficient to crosslink the polymer to form a discrete, spheroidal, water-swellable microgel as defined herein. Preferably, however, good results have been achieved when the crosslinking agent is employed in concentrations from about 5 to about 200, more preferably from about 10 to about 100 parts, by weight of crosslinking agent per million weight parts of total monomer.

The microgels are advantageously prepared by microdisperse solution polymerization techniques, e.g., the water-in-oil polymerization method described in U.S. Pat. No. 3,284,393 which is hereby incorporated in reference in its entirety. In the practice of this method, a water-in-oil emulsifying agent is dissolved in the oil phase while a free radical initiator, when one is used, is dissolved in the oil or monomer (aqueous) phase, depending on whether an oil or water-soluble initiator is used. An aqueous solution of monomer or mixed monomers or a monomer per se is added to the oil phase with agitation until the monomer phase is emulsified in the oil phase. In cases where a crosslinking comonomer is employed, the crosslinking comonomer is added along with the other monomer to the oil phase. The reaction is initiated by purging the reaction medium of inhibitory oxygen and continued with agitation until conversion is substantially complete. The product obtained has the general appearance of a polymeric latex. When it is desirable to recover the microgel in essentially dry form, the polymer microgel is readily separated from the reaction medium by adding a flocculating agent and filtering and then washing and drying the microgel. Alternatively, and preferably, the water-in-oil emulsion reaction product is suitably employed as the fluid medium containing the microgels.

A suitable, but less preferred, method for preparing the microgels is a microsuspension method wherein aqueous solutions of the monomers are suspended in an oil phase and then subjected to conditions of free radical suspension polymerization. In such method the concentration of monomer in the aqueous solution can be varied over a wide range, for example, from about 5 to about 80 weight percent of monomer in the aqueous solution, preferably from about 20 to about 40 weight percent. The choice of a particular monomer concentration depends in large part upon the particular monomer being employed as well as the polymerization temperature. The ratio of the aqueous solution of monomer to the oil phase is also widely variable, advantageously from about 5 to about 75 weight parts of aqueous phase to correspondingly from about 95 to about 25 weight parts of oil phase. The suspending agent suitably employed as a solid or liquid substance having a low hydrophile-lipophile balance, i.e., preponderantly hydrophobic. Exemplary suitable suspending agents are described in U.S. Pat. No. 2,982,749. A preferred suspending agent is an organic polymer which, while predominantly hydrophobic, has hydrophilic substituents such as amine, sulfone, sulfonate, carboxy, and the like. The suspending agent should be employed in an amount sufficient to assure the desired particle size of the resultant microgel, preferably from about 0.4 to about 1 weight percent, based on the weight of the aqueous phase. Exemplary preferred suspending agents include silanized silica, ethyl cellulose and the like. In order to insure that microgels having the desired particle size are obtained, it is often desirable to subject the water-in-oil suspension to high rates of shear.

In either process, the oil phase can be any inert hydrophobic liquid which (1) does not take part in the polymerization reaction and (2) can be separated readily from the polymeric product. Of such liquids the hydrocarbons and chlorinated hydrocarbons such as toluene, xylene, o-dichlorobenzene, ethyl benzene, liquid paraffins having from 8 to 12 carbons, monochlorobenzene, propylene dichloride, carbon tetrachloride, 1,1,1-trichloroethane, tetrachloroethylene, methylene chloride, etc., are advantageously employed, with liquid paraffins, toluene, xylene and the chlorinated hydrocarbons being preferred.

Polymerization initiators suitably employed in either the suspension or emulsion polymerization techniques include peroxygen catalysts such as t-butylhydroperoxide, dimethanesulfonyl peroxide and redox systems such as t-butyl hydroperoxide or alkali metal or ammonium persulfates in combination with usual reducing agents such as sulfide or bisulfide. Alternatively, any free radical generating means can be suitably employed, for example, those generated in situ by ultraviolet or X-rays and the like.

In addition to the employment of a crosslinking monomer as a means for forming the desired polymer microgel, other crosslinking techniques are also suitable. For example, the polymer in dispersed particulate form may be crosslinked subsequent to polymerization by treatment with a chemical crosslinking agent for the polymer such as bleach or similar alkali metal hypohalite or aldehydes such as formaldehyde and dialdehyde, e.g., glyoxal, when the polymer is one bearing pendant amide groups.

In addition, it is sometimes desirable to convert the polymer microgel to a product that has substituted cationic character such as the N-aminomethyl form (Mannich form) of polyacrylamide, or to a polycation such as the quaternized derivative of the Mannich derivative of polyacrylamide. For example, in the preparation of polymer having cationic characteristics, the polymer microgel may be reacted with formaldehyde and an amine to produce the polymer in a manner as disclosed in U.S. Pat. No. 3,539,535. The polycation may be formed by reacting the microgel of the Mannich derivative of polyacrylamide with an alkyl halide and thereby quaternize the amine nitrogen, for example, as described in the procedure in U.S. Pat. No. 3,897,333. Also it may be desirable to hydrolyze some of the amide moieties of acrylamide polymer microgels to acid form by treatment with a hydrolyzing agent such as sodium hydroxide.

In the practice of employing the aforementioned microgels in a process for recovering oil from a subterranean formation, it is desirable to disperse the microgel in a fluid medium, preferably water or a water-in-oil emulsion, such that the resulting dispersion is reasonably stable. The concentration of the microgel in the fluid medium is suitably any concentration that effects the desired control of the permeability of the treated formation before excessive amounts of the fluid medium pass into the producing well or out of the porous structure being treated as the case may be. In order to minimize the viscosity of the fluid medium containing the microgel and thereby reduce the amount of energy required to pump the fluid medium into the subterranean formation, it is desirable to dilute the microgel in the fluid medium as much as possible prior to its introduction into the well bore or porous structure. In preferred embodiments utilized for fluid mobility control in enhanced oil recovery, it is desirable that the concentration of the microgel in the fluid medium be in the range from about 100 to about 50,000 ppm of dry polymer based on the total weight of the fluid medium, more preferably from about 250 to about 10,000 ppm, most preferably 250 to about 5,000 ppm.

While the particle size of the microgel is not particularly critical, it is found that the microgels are most advantageously employed in porous structures that are generally free of large fractures or vugs that are more than 10 times the diameter of the swollen microgel and preferably is free of vugs that are about 5 times or more in size than the diameter of the swollen microgel. In the most preferred embodiments, it is desirable to employ microgels having diameters that are from about one-third to about the same size as the average pore size of the porous subterranean formation. In selecting a microgel, it should be understood that it is the particle size that the microgel will possess in the porous subterranean structure to be treated that is significant. Accordingly, the gel capacity of the microgel, i.e., its ability to absorb the aqueous medium native to the subterranean formation to be modified, is a significant factor in determining which microgels will most beneficially control the permeability of a particular subterranean structure. For example, it is observed that the unswollen microgels can sometimes absorb as much as 5 to 10 times as much water when dispersed in deionized water as they will absorb when they are dispersed in a salt solution similar to the brines that exist in many oil-bearing subterranean formations. For example, a partially swollen microgel (30 percent polymer solids) prepared with 30 ppm methylene bisacrylamide based on total monomer and having an average diameter of about 1 micrometer can increase to a water swollen microgel having an average diameter of about 5 micrometers when fully diluted with deionized water whereas it can only increase to a water swollen microgel having an average diameter of 3.8 micrometers when fully diluted with 0.7 molar aqueous solution of sodium chloride.

The fluid medium used to carry the microgels into the subterranean formation is suitably any fluid medium which does not substantially inhibit the water swelling characteristics of the microgels. Most commonly, the fluid medium is an aqueous liquid which may contain a variety of other ingredients such as salts, surfactants, bases such as caustic and other additaments commonly employed in the drive fluid of enhanced oil recovery operations. In addition to water and other suitable liquid aqueous media, the fluid medium may comprise alcohols, organic acids, glycols and most often water-in-oil emulsions wherein the microgels reside in the aqueous phase of such emulsions. In such emulsions, the oil phase can be generally hydrocarbon, halohydrocarbon or similar water immiscible organic fluids. Of the foregoing fluid media, water is preferred.

As indicated hereinbefore, the aforementioned fluid medium containing the microgels is particularly useful in fluid drive operations for the enhanced recovery of oil. The microgels are particularly effective for decreasing the mobility of the drive fluid, such as water or other fluids, or decreasing the permeability of nonfractured porous formations prior to or during enhanced oil recovery operations which involve the use of fluid drive. Such microgels are also useful for water shutoff treatments in production wells. In such processes, the fluid medium containing the microgels can be injected into the formation prior to or subsequent to the injection of another fluid.

In another embodiment of the invention, a conventional water flood or gas drive is carried out in a conventional manner until the drive fluid breaks through into the production well in excessive amounts. At such time the microgels dispersed in the fluid medium are then pumped into the well through which the drive fluid is being supplied and into the porous formation in any suitable manner, in any suitable amount, and for any desired period of time sufficient to obtain the desired in-depth penetration and decrease in the mobility of the drive fluid. Injection of the microgels in this manner will plug the thief zone adjacent to oil-bearing strata. At this point, the water or brine flood can be restarted to force oil from the oil-bearing strata.

In yet another embodiment, the microgels can be applied to producing wells, (including oil wells or gas wells), where there is an unstable, nonhydrocarbon-bearing strata adjacent to the hydrocarbon-bearing strata. For example, if a water sand is adjacent to the hydrocarbon-bearing sand and the water intrudes into the bore hole thereby interfering with the production of hydrocarbon, the formation can be treated with microgels to shut off the flow of water. The method of treatment in this case is essentially the same as described in connection with the fluid drive operations.

In any of the above-described embodiments of the invention, a slug of an ungelled polymer can sometimes be advantageously injected into the formation prior to the injection of microgels in the manner generally described in U.S. Pat. No. 3,039,529. The initial injection of water-soluble (linear) polymer often satisfies the absorption requirements of the formation and also aids in reducing face plugging if this is a problem.

It is also within the scope of this invention to inject the microgel into the subterranean formation periodically or intermittently, as needed, during the course of a fluid drive operation or during the production of oil or gas from a producing well. In all of the foregoing operations, the injection of the fluid medium containing the microgels can be carried out in any conventional manner. It is one of the particular advantages of the present invention that the microgels dispersed in a liquid may be stored for substantial periods of time and then pumped into the subterranean formation as desired.

In addition to the aforementioned enhanced oil recovery applications, the microgels dispersed in the fluid medium may be employed as drilling fluids or in combination therewith in the drilling of wells in any manner known to the art for the use of drilling fluids. As is known to the artisan skilled in well drilling, drilling fluids are employed to remove cuttings and to maintain pressure in the well to prevent blowout. The use of microgels in drilling fluids minimizes the loss of drilling fluid via penetration of subterranean strata near the well. While the microgels can be employed alone as the drilling fluid, it is often desirable to include weighting agents such as barium carbonate, barium sulfate, amorphous silica and the like as well as linear water-soluble polymers such as polyacrylamide or derivatives thereof such as the cationic Mannich derivatives or quaternized Mannich derivatives in the drilling fluids containing the microgels. If desired, other additives compatible with the microgels can also be included in the drilling fluid, e.g., clays such as bentonite and attapulgite, fluid loss agents, and the like. In the selection of such additives for the use in a particular drilling fluid, care should be taken to avoid materials which are not compatible with the microgels. As for combining the additives with the microgels, any conventional manner for preparing drilling fluids for this purpose are suitable. Moreover, these microgels are suitably employed in either the high solids or low solids drilling fluids known to the oil industry.

The following examples are given to illustrate the invention and should not be used to limit its scope. Unless otherwise indicated all parts and percentages are by weight.

EXAMPLE 1

A. Preparation of the Microgels

To an oil phase consisting of ingredients as listed hereinafter is added an aqueous solution of monomers as also described hereinafter with agitation until the monomer phase is emulsified in the oil phase.

| Ingredients | Amount, grams |
| --- | --- |
| Aqueous Phase | |
| Acrylamide | 134.4 |

-continued

| Ingredients | Amount, grams |
|---|---|
| Acrylic acid | 33.6 |
| Sodium hydroxide | 28.75 |
| Deionized water | 403.25 |
| Methylene-bis-acrylamide | 0.0047 (28 ppm) |
| DETPA* | 0.168 (1000 ppm) |
| t-butyl hydroperoxide | 0.0420 (250 ppm) |
| Sodium bisulfite | 0.0218 (130 ppm) |
| Oil Phase | |
| Deodorized kerosene | 240.3 |
| Isopropanolamide of oleic acid | 16.8 |

*Pentasodium salt of diethylenetriamine-pentaacetic acid

In forming the emulsion, the aforementioned aqueous phase (less the t-butyl hydroperoxide and sodium bisulfite) is mixed with the oil phase using controlled high shear, i.e., 30 seconds in a Waring Blendor or Eppenbach Homogenizer. The resulting emulsion is placed in a reactor which is purged for 1 hour with $N_2$. The t-butyl hydroperoxide (20 percent aqueous solution emulsified in oil at a weight ratio of ~3 oil to 5 water) is added to the reactor in a single shot. The sodium bisulfite (2 percent aqueous solution emulsified in oil at a weight ratio of ~3 oil:5 water) is added portionwise to the reactor in 10-ppm increments until polymerization of the monomers is completed. After polymerization, the temperature is increased to 60° C. for 2 hours. In a dispersion of the water-swellable microgels in deionized water containing 30 percent polymer, it is observed that the mean particle diameter of the water-swollen microgels is about one micrometer.

B. Water Permeability Reduction Tests

The ability of the microgels to control permeability of porous subterranean formations is determined using a series of Berea sandstone cores according to the following test procedure. In most of the core samples (2.54 cm length × 2.54 cm diameter), the pore volume is from 2.8 to 3.2 ml and the pore size is from about 14 to 16 micrometers. The initial core permeability is determined by pressuring an aqueous solution of NaCl (4%) through the core in forward and reverse directions. The aforementioned microgels are diluted to 0.02% solids by adding deionized water and injected into the core sample at 10 psig. The microgel injection is followed with a brine flow in the forward and reverse direction to establish the permeability reduction. The differential pressure during the brine flow is then increased in 20 psi increments to 60 psi. After each incremental increase, 50 ml of brine is passed through the core sample and the flow rate is determined. The pressure is then returned to the original test pressure of 10 psig and a final brine flow rate is determined after the sample stabilizes (flow rate becomes constant). Comparison of initial and final brine flow rates establish the permeability reduction resulting from the microgel treatment of the core sample. The results for this sample (Sample No. 1) are recorded in Table I.

For the purposes of comparison, several water-soluble (noncrosslinked) acrylamide/acrylic acid copolymers (Sample Nos. $C_1$–$C_5$) are similarly tested for water diverting capability. The results of these tests are similarly reported in Table I.

EXAMPLE 2

Following the general procedure for preparing acrylamide/acrylic acid copolymer microgels as specified in Example 1, microgels are prepared using amounts of methylenebis(acrylamide) ranging from 7 to 200 parts per million instead of the 28 parts per million employed in Example 1. Also runs are carried out using polyacrylamide microgels wherein the carboxyl moiety is varied from 5 to 40 mole percent. The resulting microgels are similarly tested for their water diverting capability by the procedure set forth in Example 1 and the results for the samples (Sample Nos. 2–7) are similarly recorded in Table I.

TABLE I

| Sample No. | Polymer Mole % COOH | Polymer ppm MBA(1) | Viscosity, cps(2) | Dry Polymer Concentration, ppm(3) | Permeability(4) Initial, md | Permeability(4) Treated, md Forward | Permeability(4) Treated, md Reverse | Permeability Reduction, % Forward | Permeability Reduction, % Reverse |
|---|---|---|---|---|---|---|---|---|---|
| 1 | 20 | 28 | 2.2 | 2000 | 322 | 3 | 14 | 99.4 | 95.6 |
| 2 | 20 | 100 | 1.4 | 2000 | 357 | 23.1 | 65.7 | 93.2 | 81.6 |
| 3 | 20 | 7 | <5 | 2000 | 212 | 172 | 60 | 19 | 71 |
| 4 | 20 | 14 | " | " | 350 | 12 | 19.6 | 96.5 | 94.4 |
| 5 | 20 | 200 | " | " | 369 | 64 | 89 | 83 | 76 |
| 6 | 5 | 100 | " | " | 435 | 8 | 81 | 98 | 81 |
| 7 | 40 | 100 | " | " | 290 | 9 | 24 | 97 | 92 |
| $C_1$* | 20 | 0 | >5 | " | 468 | 60 | 130 | 87 | 72 |
| $C_2$* | 15–25 | 0 | 6.0 | 1500 | 347 | 286 | 192.6 | 17.5 | 44.5 |
| $C_3$* | 15–25 | 0 | 8.0 | 1500 | 477 | 121 | 95.4 | 77 | 80 |
| $C_4$* | 15 | 0 | 10.6 | 1500 | 108 | 4.6 | 10.8 | 95.6 | 90 |
| $C_5$* | 1 | 0 | >5 | 1900 | 481 | 431 | 408.5 | 25.5 | 15.0 |

*Not an example of the invention
(1) parts per million of methylene-bis-acrylamide (crosslinker) based on total monomer
(2) Brookfield viscosity in centipoise at 0.10 percent dry polymer in a 4 percent NaCl aqueous solution at 25° C. using a Brookfield Viscometer (Model LVS) with an UL adapter and operating at 6.6 sec$^{-1}$.
(3) parts per million of dry polymer based on the total aqueous medium used in polymer treatment of the core.
(4) permeability of the core sample in millidarcies (md) using the water diversion test procedure of Example 1.

As evidenced by the data in Table I, the fluid microgel compositions of the present invention exert a generally greater control of the permeability of porous core samples (fluid mobility control) at lower viscosities than do compositions containing linear polymer.

EXAMPLE 3

To illustrate the effect of microgel particle size on the ability of the microgel to control fluid mobility in a core sample of a given pore size, three core tests are carried out using synthetic core samples each having an average pore size of 24–26 micrometers and microgels having different average diameters as specified in Table II. The polymer of each of the microgel samples is an acrylamide/acrylic acid (80/20) copolymer which has been crosslinked with 14 ppm of methylene bis(acrylamide). The microgels are injected into the core samples under a pressure of 10 psi. The treated core samples are tested for permeability in the forward direction and the results are recorded in Table II.

TABLE II

| | Microgel Particle Size, μm | | Permeability(1) | |
|---|---|---|---|---|
| Run No. | Partly Water Swollen 70% H₂O | Water Swollen 98% H₂O md | Initial, md | Treated, md |
| 1 | 1 | 3 | 5560 | 171 |
| 2 | 5 | 15 | 5350 | 49 |
| 3 | 12 | 36 | 6378 | 7 |

(1) Same as (4) in Table I

While Run No. 3 provides the greatest reduction in permeability, it is noted that Run No. 2 provides the most effective permeability control without a substantial increase in the energy to pump the microgels into the core sample. Accordingly, it is generally more preferred to employ microgels having water-swollen diameters that are from about one-third to about the same size as the average pore size of the formation being treated.

What is claimed is:

1. In a hydrocarbon recovery method wherein a production well bore penetrates a subterranean formation having at least hydrocarbon-bearing stratum and adjacent thereto a least one stratum bearing an aqueous fluid, the improvement which comprises introducing into said subterranean formation via the production well bore a fluid medium containing discrete, spheroidal microgels of a water-swellable or water-swollen, crosslinked polymer of ethylenically unsaturated water-soluble monomer(s) in an amount sufficient to reduce the aqueous fluid permeability of the porous formation, said microgels in at least a partially water-swollen state having diameters in the range from about 0.5 to about 200 micrometers, said polymer being crosslinked with from about 5 to about 200 weight parts of a copolymerizable polyethylenic monomer per million parts of total monomers of the polymer, thereby controlling the flow of the aqueous fluid into the well bore.

2. The improvement of claim 1 wherein the crosslinked polymer is a crosslinked polymer of an α,β-ethylenically unsaturated amide, or a N-substituted derivative thereof, the concentration of microgel in the fluid medium is from about 250 to about 10,000 parts of crosslinked polymer calculated on a dry weight basis to a million weight parts of the fluid medium.

3. The improvement of claim 1 wherein the crosslinked polymer is an α,β-ethylenically unsaturated amide polymer or a polymer of an N-substituted-(N'-dialkylaminoalkyl) derivative of said amide or a polymer of a quaternized derivative of said N-substituted derivative.

4. The improvement of claim 1 wherein the polyethylenic comonomer is an N,N'-alkylidene-bis-(ethylenically unsaturated amide).

5. The improvement of claim 1 wherein the water-soluble ethylenically unsaturated monomer is selected from the group consisting of α,β-ethylenically unsaturated amides, N-substituted-(N'-dialkylaminoalkyl)acrylamides and their quaternized derivatives, ethylenically unsaturated carboxylic acids, ethylenically unsaturated quaternary ammonium compounds, sulfoalkyl esters of unsaturated carboxylic acids, aminoalkyl esters of unsaturated carboxylic acids and vinylaryl sulfonates.

6. The improvement of claim 1 wherein the hydrocarbon bearing stratum is a gaseous hydrocarbon bearing stratum.

7. The improvement of claim 1 wherein the crosslinked polymer is an acrylamide polymer containing from about 5 to about 40 weight percent of polymerizing acrylic acid and crosslinked with from about 10 to about 100 weight parts of an N,N'-alkylidene-bis(ethylenically unsaturated amide) per million parts of total monomer of the polymer.

8. The improvement of claim 7 wherein the hydrocarbon bearing stratum is a gaseous hydrocarbon bearing stratum.

* * * * *

UNITED STATES PATENT AND TRADEMARK OFFICE
CERTIFICATE OF CORRECTION

PATENT NO. : 4,182,417

DATED : January 8, 1980

INVENTOR(S) : Charles J. McDonald; John V. Van Landingham and Steven P. Givens

It is certified that error appears in the above-identified patent and that said Letters Patent are hereby corrected as shown below:

Column 4, line 1, delete "or" and insert --of--.

Column 11, TABLE II, the headings should read as follows:

| Run No. | Microgel Particle Size, μm | | Permeability (1) | |
|---|---|---|---|---|
| | Partly Water Swollen 70% $H_2O$ | Water Swollen 98% $H_2O$ | Initial, md | Treated, md |

Signed and Sealed this

Seventeenth Day of November 1981

[SEAL]

Attest:

Attesting Officer

GERALD J. MOSSINGHOFF

Commissioner of Patents and Trademarks